BEST AVAILABLE COPY

DESIGN.

J. NONNENBACHER.

Picture-Frames, &c.

No. 5,986. Reissued July 28, 1874.

Witnesses:
Arthur Hill
John Inglis Jr.

Inventor:
John Nonnenbacher

BEST AVAILABLE COPY

NITED STATES PATENT OFFICE.

JOHN NONNENBACHER, OF NEW YORK, N. Y.

DESIGN FOR MOLDINGS FOR PICTURE-FRAMES, &c.

cification forming part of Design No. 6,959, dated October 14, 1873; reissue No. 5,986, dated July 28 1874; application filed May 1, 1874.

*ll whom it may concern:*

: it known that I, JOHN NONNENBACHER, ie city, county, and State of New York, : invented a Design for Molding to be . for Picture-frames, Cornices, &c., of :h the following is a specification:

ie nature of my design is fully illustrated 'igure 2 of the accompanying drawing, :h represents a cross-section giving an out- thereof, to which reference is made.

represents a portion of the molding, with ound top brought well forward. *b* repre- :s a convex portion of the molding. *c* rep- ents a recess and concave portion of the ding. *d* represents a slightly-convex part he molding, sunk. The other parts of the ding are clearly defined in Fig. 2 of the l drawing, which represents the design as hole, and which may be varied in some of minor and unimportant details without stantially changing the design or altering general effect when viewed at a little dis- ce.

'ig. 1 represents a face-elevation of my l design for a molding, with its members iously ornamented—that is to say: *a*, with usticated staff, raised and in gilt; *c*, with sed ornaments, as shown, in gilt; *d*, with a ooth surface and having a flat ornamenta- n, the ground being silvered over the gilt, ving the ornament in bright gilt. All the re- maining members or parts of the molding, as shown, are in silver gilt.

The ornaments, as above described, as well as the color, in gilt or otherwise, of the several parts or members, may be slightly varied or imitated without changing the character of the general design, as shown in No. 2, or the effect upon the eye of the molding when finished and ready for use, as seen from a distance at which moldings in use are usually observed.

Figure 2:
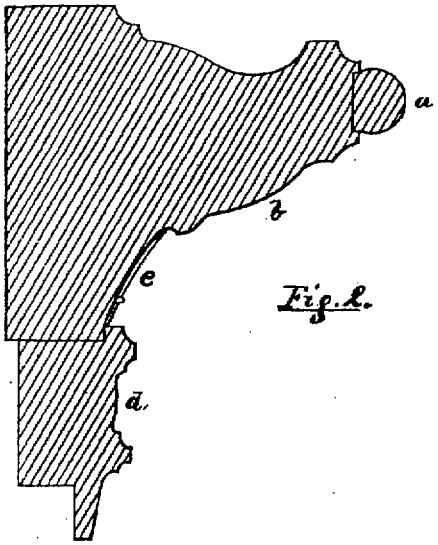

I do not claim the several forms of molding, separately and individually considered, which have been assembled together to make up the design shown in Fig. 2, which may be composed of more or less parts or pieces of wood or other material, accordingly as the economy of manufacture may be served; but What I do claim is—

Figure 1:
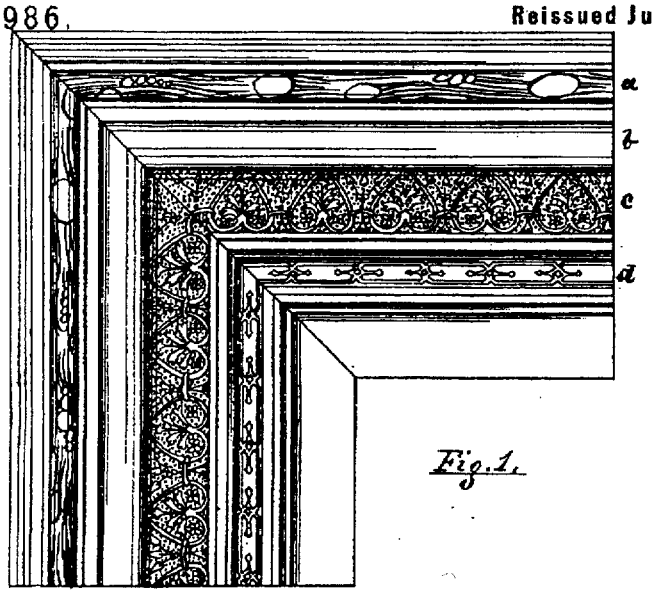

1. The design of a molding for frames, cornices, &c., as shown in Fig. 2 of the drawing.
2. The design for the face of stripe C′, as shown.
3. The design for the face of stripe D, as shown.
4. The design for the face of the molding, as shown in Fig. 1 of the drawing.

JOHN NONNENBACHER.

Witnesses:
JONAS H. GOODMAN,
K. STINER.